United States Patent
Knudsen et al.

(10) Patent No.: US 6,912,004 B1
(45) Date of Patent: Jun. 28, 2005

(54) METHOD AND SYSTEM FOR PROCESSING IMAGES

(75) Inventors: Niels V. Knudsen, Hellerup (DK); Michael Jønsson, Vallensbæk Strand (DK)

(73) Assignee: Phase One A/S, Frederiksberg (DK)

( * ) Notice: Subject to any disclaimer, the term of this patent is extended or adjusted under 35 U.S.C. 154(b) by 0 days.

(21) Appl. No.: 09/354,847

(22) Filed: Jul. 16, 1999

(30) Foreign Application Priority Data

Sep. 15, 1998 (DK) .......................................... 1998 01161

(51) Int. Cl.$^7$ .......................... H04N 5/335; H04N 9/64; H04N 5/228; H04N 1/46; G06K 9/32

(52) U.S. Cl. ..................... 348/273; 348/242; 348/222.1; 358/525; 382/300

(58) Field of Search ................................. 358/525, 518; 348/241, 246, 251, 273, 222.1, 242, 272, 277–280; 382/300

(56) References Cited

U.S. PATENT DOCUMENTS

| | | | |
|---|---|---|---|
| 4,607,287 A | 8/1986 | Endo et al. | |
| 4,642,678 A | 2/1987 | Cok | |
| 4,652,928 A | 3/1987 | Endo et al. | |
| 4,894,726 A | 1/1990 | Steinhardt et al. | |
| 4,979,136 A | 12/1990 | Weiman et al. | |
| 4,998,164 A | 3/1991 | Endo et al. | |
| 5,063,448 A | 11/1991 | Jaffray et al. | |
| 5,063,450 A | 11/1991 | Pritchard | |
| 5,237,446 A | 8/1993 | Takahashi | |
| 5,287,419 A | 2/1994 | Sato et al. | |
| 5,295,204 A | 3/1994 | Parulski | |
| 5,347,599 A | * 9/1994 | Yamashita et al. | .......... 382/278 |
| 5,373,322 A | 12/1994 | Laroche et al. | |
| 5,481,628 A | 1/1996 | Ghaderi | |
| 5,486,927 A | 1/1996 | Koizumi et al. | |
| 5,506,619 A | 4/1996 | Adams, Jr. et al. | |
| 5,510,835 A | 4/1996 | Nishizawa et al. | |
| 5,552,825 A | 9/1996 | Talluri et al. | |
| 5,552,827 A | * 9/1996 | Maenaka et al. | ........... 348/266 |
| 5,612,908 A | 3/1997 | Pechanek et al. | |
| 5,614,947 A | 3/1997 | Tanizoe et al. | |
| 5,652,621 A | * 7/1997 | Adams et al. | ............... 348/272 |
| 5,682,443 A | 10/1997 | Gouch et al. | |
| 5,798,846 A | 8/1998 | Tretter | |
| 5,838,840 A | 11/1998 | King et al. | |
| 5,852,678 A | 12/1998 | Shiau et al. | |
| 5,877,806 A | 3/1999 | Kawano | |
| 5,877,807 A | 3/1999 | Lenz | |
| 5,915,047 A | 6/1999 | Muramoto | |
| 5,969,757 A | 10/1999 | Okada et al. | |

(Continued)

FOREIGN PATENT DOCUMENTS

| | | |
|---|---|---|
| EP | 0 393 598 B1 | 4/1990 |
| EP | 0 632 663 A2 | 6/1994 |
| EP | 0 632 663 A | 1/1995 |
| WO | WO 97 35438 A | 9/1997 |
| WO | WO 97 48231 A | 12/1997 |
| WO | WO 99/04555 | 6/1998 |

*Primary Examiner*—Andrew Christensen
*Assistant Examiner*—Nhan Tran
(74) *Attorney, Agent, or Firm*—Volentine Francos & Whitt, PLLC

(57) ABSTRACT

A method and a system for processing images using interpolating. A variation value for different sets of pixels is determined, and the set of pixels with the highest correlation (lowest numeric value) is selected. A missing color at a given pixel is expressed in terms of the information contained in the selected set of pixels. If the variation value is below a certain threshold, due to noise or other factors, an alternative set of pixels using a different variation method may be selected. The missing color is estimated as a weighted sum of, e.g., the green samples divided by the weighted sum of, e.g., the red samples multiplied by the sampled value from the pixel to be estimated.

8 Claims, 5 Drawing Sheets

U.S. PATENT DOCUMENTS

| | | | |
|---|---|---|---|
| 5,978,519 A | | 11/1999 | Bollman et al. |
| 6,040,569 A | * | 3/2000 | Hynecek .................. 250/208.1 |
| 6,108,455 A | | 8/2000 | Mancuso |
| 6,151,030 A | | 11/2000 | DeLeeuw et al. |
| 6,173,075 B1 | | 1/2001 | Collins |
| 6,356,588 B1 | | 3/2002 | Otto |
| 6,408,109 B1 | * | 6/2002 | Silver et al. ................ 382/300 |
| 6,427,031 B1 | | 7/2002 | Price |
| 6,493,029 B1 | * | 12/2002 | Denyer et al. .............. 348/237 |
| 6,535,652 B2 | | 3/2003 | Nakatsuka |
| 6,587,148 B1 | | 7/2003 | Takeda et al. |
| 6,631,206 B1 | | 10/2003 | Cheng et al. |
| 2001/0043755 A1 | | 11/2001 | Edgar |
| 2003/0002747 A1 | | 1/2003 | Zaklika et al. |

* cited by examiner

| # | 1 | 2 | 3 | 4 | 5 | 6 | .. | m |
|---|---|---|---|---|---|---|----|---|
| 1 | R | G | R | G | R | G | R | G |
| 2 | G | B | G | B | G | B | G | B |
| 3 | R | G | R | G | R | G | R | G |
| 4 | G | B | G | B | G | B | G | B |
| 5 | R | G | R | G | R | G | R | G |
| 6 | G | B | G | B | G | B | G | B |
| .. | R | G | R | G | R | G | R | G |
| n | G | B | G | B | G | B | G | B |

Fig. 1

Set of pixels #1

```
R G R G R G R G R
G B G B G B G B G
R G R G R G R G R
G B G B G B G B G
R G R G R G R G R
G B G B G B G B G
R G R G R G R G R
G B G B G B G B G
R G R G R G R G R
G B G B G B G B G
```

Set of pixels #2

```
R G R G R G R G R
G B G B G B G B G
R G R G R G R G R
G B G B G B G B G
R G R G R G R G R
G B G B G B G B G
R G R G R G R G R
G B G B G B G B G
R G R G R G R G R
```

Set of pixels #3

```
R G R G R G R G R
G B G B G B G B G
R G R G R G R G R
G B G B G B G B G
R G R G R G R G R
G B G B G B G B G
R G R G R G R G R
G B G B G B G B G
R G R G R G R G R
```

Set of pixels #4

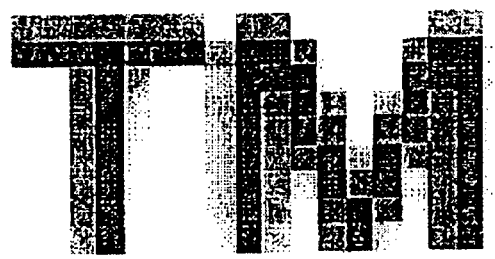
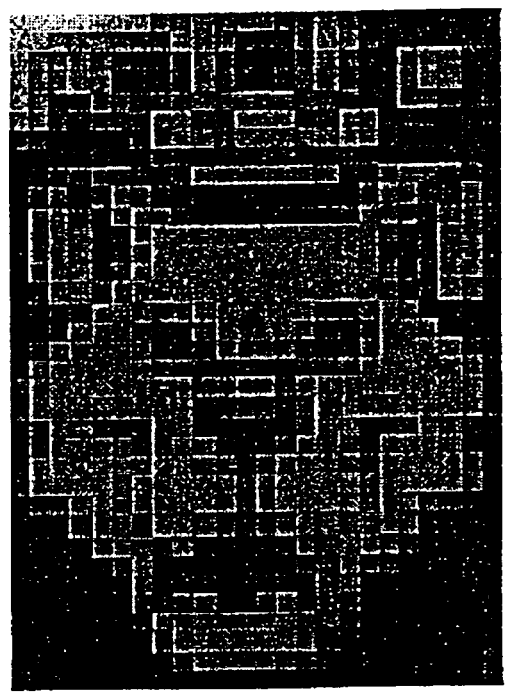
Fig. 3

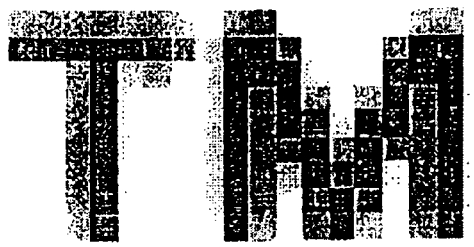
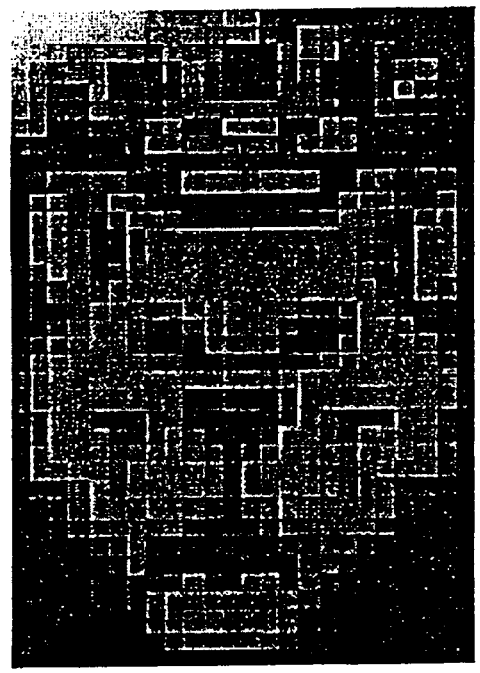
Fig. 4

METHOD AND SYSTEM FOR PROCESSING IMAGES

CROSS-REFERENCES TO RELATED APPLICATIONS

The present application claims priority under 35 U.S.C. §119 to Danish Patent Application No. PA 1998 01161 filed on Sep. 15, 1998, the entire contents of which are hereby incorporated by reference.

BACKGROUND OF THE INVENTION

1. Field of the Invention

This invention relates to a method and a system for processing images. The invention relates in particular to a method and a system for processing an image using interpolating.

2. Description of Related Art

It is well known to represent an image digitally by dividing the image into a large number of segments, denoted pixels, and allocating digital values, denoted pixel values, to each pixel. Typically, the image is divided into a matrix of rows and columns of pixels and the size of a digital image is then given by the number of pixels in a row and the number of pixels in a column. The pixel values are typically stored in an array in a digital memory.

For example, a grey tone image may be represented digitally by a digital image comprising pixels each of which has one pixel value representing the grey tone of the corresponding pixel. Similarly, a colour image may be represented by a digital image comprising pixels each of which have three pixel values, one for each of the colors red, green, and blue.

Typically, a digital image is created by transmission of light towards an object and detection by an electronic camera of light reflected from or transmitted through the object. However, in general a digital image may be created by transmission of any kind of radiated energy, such as electromagnetic radiation, such as visible light, infrared radiation, ultraviolet radiation, X-rays, radio waves, etc., ultrasound energy, particle energy, such as electrons, neutrons, etc., etc., towards an object for interaction with the object and by detection of energy having interacted with the object, such as by reflection, refraction, absorption, etc.

A digital image may be formed by any imaging system, such as radiometer systems, infrared systems, radar systems, ultrasound systems, X-ray systems, electronic cameras, digital scanners, etc., adapted to detect the kind of energy in question and to generate a digital image based on the energy detection.

The amount of energy needed to record a digital image with a desired signal to noise ratio, i.e. the sensitivity of the imaging system, is determined by the noise level in the imaging system. Energy detectors of any kind generate noise that adds to the signal desired to be recorded. The signal to noise level of a digital image is typically required to be comparable to if not better than the signal to noise level of an image recorded on a photographic film for subsequent reproduction in professional publications.

Typically, an image recording system operating in the visible light range of electromagnetic radiation, such as an electronic camera, a digital camera, an electronic scanner, a digital scanner, etc., uses a solid state imaging device, typically a charge coupled device (CCD), for recording of an image.

The CCD is an array of a large number of light sensitive detectors connected to each other as an analog shift register. In each detector of the CCD a charge is formed that is proportional to the light energy incident on the detector during an integration period. The analog charge of each detector is shifted serially out of the CCD and is typically converted to a digital value whereby a digital representation of the recorded image is formed. Each pixel value of the digital image is equal to the digitised charge of the corresponding CCD detector. The pixel values may be transferred to an external computer through a computer interface or may be stored on a memory card or on a rotating magnetic recording medium.

It is known in the art to use linear CCDs in an image recording system in which the linear CCDs light-sensing detectors are arranged in a single line. Typically, the array is moved across the image, scanning it one line at a time. For colour images, filters can be placed in front of the array, which then makes three passes across the image during image recording.

Offering a good compromise of image resolution (high pixel count) and cost in an image recording system is the trilinear CCD array, which includes three linear CCDs positioned side by side. Each line is covered by its own colour filter. The array makes a single pass across the image, and each linear CCD records a line at a time.

At a higher cost, a two-dimensional CCD array can capture the entire image in a very short time. Three separate exposures with three colour filters can be used to make a colour representation. For example, the colour filters can be placed in a rotating wheel that sequentially inserts each colour filter in the optical path between the image forming optics of the image recording system and the two-dimensional CCD array.

In the present context, the term exposure is to be understood in a broad sense as the time period during which an energy sensor is actually sensing the energy. For example, a photographic film is exposed to light whenever light is incident upon it, while a CCD is exposed to light when the elements of the CCD are allowed to integrate light incident upon them. The CCD is not exposed when its light sensing elements are short-circuited although light may be incident upon them.

It is well known in the art to size a digital image, i.e. to change, typically reduce or enlarge, the size of the digital image, i.e. the number of pixels of the digital image in order to minimise the amount of pixel data to be stored for later processing of the digital image. Various, sometimes complex, strategies for forming sets of pixels from which new pixel values are calculated may be employed. In a very simple example, a digital image may be downsized by reducing the number of pixels of the digital image by an integer, e.g. by a number of four. In this case, the pixels of the original digital image is divided into sets of four pixels each and each set of pixels is transformed into a new pixel of a pixel value equal to the average value of the original pixel values. Thereby, a new digital image of one-fourth the size of the original digital image is generated.

Further, it is well-known to adjust brightness of an image produced from a digital image by forming a new digital image with the same number of pixels as the original image in which each of the new pixel values is generated by a linear or non-linear transformation of the corresponding original pixel value.

Further it is well known from, e.g., U.S. Pat. No. 5,373,322 that in order to generate a high quality colour information relating to at least three primary colours are required at the position of each pixel in an image. In case where information's relating to three primary colours are not available in each pixel of, e.g. a CCD interpolation complex methods involving linear or nonlinear transformation methods are required A disadvantage of these complex conventional processing methods is related to the time required for processing the image. To obtain a high quality colour image complicated mathematical algorithms are applied in the process of transforming a low-resolution colour image into a high-resolution colour image.

A further disadvantage of the conventional processing methods is related to the presence of colour artifact (aliasing) which significantly disturbs the interpretation of a colour image.

SUMMARY OF THE INVENTION

The present invention is therefore directed to a method and system for estimating a missing colors in recorded images which substantially overcomes one or more of the problems due to the limitations and disadvantages of the related art.

It is an object of the present invention to provide a method and a system for estimating the missing colors in images recorded using colour filter array based CCD technology. It is another object of the present invention to provide a method and a system for estimating the missing colors in images recorded using scanner-based technology.

At least one of these and other objects may be realized by providing a method including dividing an image into a matrix of pixels for holding color values;

forming a first set of pixels that are positioned adjacent to a selected pixel;

calculating a first variation value using ratios between color values of the pixels of the first set;

forming a second set of pixels that are positioned adjacent to the selected pixel;

calculating a second variation value using ratios between color values of the pixels of the second set;

comparing the first and second variation values and selecting the set of pixels having a lowest variation value; and calculating a first color value of the selected pixel by calculating the first color value from first color values of the selected set of pixels.

By adjacent is meant that the selected set of pixels should be near the selected pixel.

The image processing method may further include second color values, e.g., red, of the set of pixels with the lowest variation value are included in the calculation of the first color value. In particular, the second color values may be included in the calculation of variation values of the first and second set of pixels, respectively.

According to the present invention each of the calculating of variation values of the first and second set of pixels, respectively, may include: calculating the ratio between first color values and second color values of abutting pixels of the respective set of pixels, calculating a mean value of the calculated ratio values, and calculating the variation value of the respective set of pixels as the sum of the absolute value of the difference between each of the ratios and the mean value.

The calculating of the first color value may include calculating a weighted sum of second color values of the set of pixels with the lowest variation value, calculating a weighted sum of first color values of the set of pixels with the lowest variation value, and calculating the first color value by multiplying the second color value of the selected pixel with the ratio between the weighted sums of the first and second color values.

The first color value may be calculated from not only two color values, but may be calculated from an arbitrary number of color values.

The image recorded for further processing may be recorded by an electronic camera comprising a scanner or a CCD or a Bulk Charge Modulated Device (BCMD). In case of an electronic camera comprising a CCD the camera may further comprise a color filter mask positioned in front of the CCD, the color filter mask comprising a plurality of color filters. The color filter mask may be of the type Bayer 2G.

The selected set of pixels may take any form and may comprise an arbitrary number of pixels. In particular, the selected sets of pixels may be arranged in rows and columns parallel to the rows and columns of the pixels in the image matrix. Alternatively the selected sets of pixels may be arranged in rows at an angle of approximately 45 degree relative to the rows and columns of pixels in the image. In another alternative the selected sets of pixels may be arranged in rows and columns parallel to the rows and columns of the pixels in the image matrix and at an angle of approximately 45 degree relative to the rows and columns of pixels in the image. The selected set of pixels may also be arranged at an arbitrary angle relative to the rows and columns of the pixels in the image. The number of selected sets of pixels may be arbitrary. Preferably the number of selected sets of pixels is larger than 2, such as 4.

At least one of these and other objects may be realized by providing an image processing system having a memory which stores color values of a matrix of pixels of an image; and a processor connected to the memory and adapted for calculating a first color value of a selected pixel in the matrix, by calculating the first color value using ratios between first and second color values derived from the first and second color values of a selected set of pixels that are positioned adjacent to the selected pixel.

According to the invention the image processing system may further comprise an electronic camera comprising a scanner and CCD.

It is an advantage of the present invention is that the method and system significantly improves the ability to estimate the missing luminance information in a digitised image. A correct estimation of the missing luminance information is vital for the impression of sharpness and detail richness.

It is a further advantage of the present invention that all chrominance information are preserved to give images the highest degree of color fidelity while avoiding all of the well known aliasing.

It is a still further advantage of the present invention that the relative low complexity of the method makes it easy to implement in both software and/or hardware based applications. The method is also applicable in other areas of imaging such as image scaling, image compression and visual enhancements such as unsharp masking and noise reduction.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 1 shows a color filter pattern of the type Bayer 2G. Each cell in the grid represents a photosite or pixel on the m×n array CCD where m is the number of photosites in each row on the CCD, n is the number of rows on the CCD, R is the number of photosites covered with red filter material (called Red photosites), G is the number of photosites covered with green filter material (called Green photosites) and B is the number of photosites covered with blue filter material (called Blue photosites);

FIG. 2 shows an illustration of four selected set of pixels;

FIG. 3 shows a reference image recorded using a state-of-art digital camera with three CCD arrays;

FIG. 4 shows an image recorded using a digital camera with only one CCD array and processed according to the present invention.

DETAILED DESCRIPTION OF PREFERRED EMBODIMENTS

Figure 5:
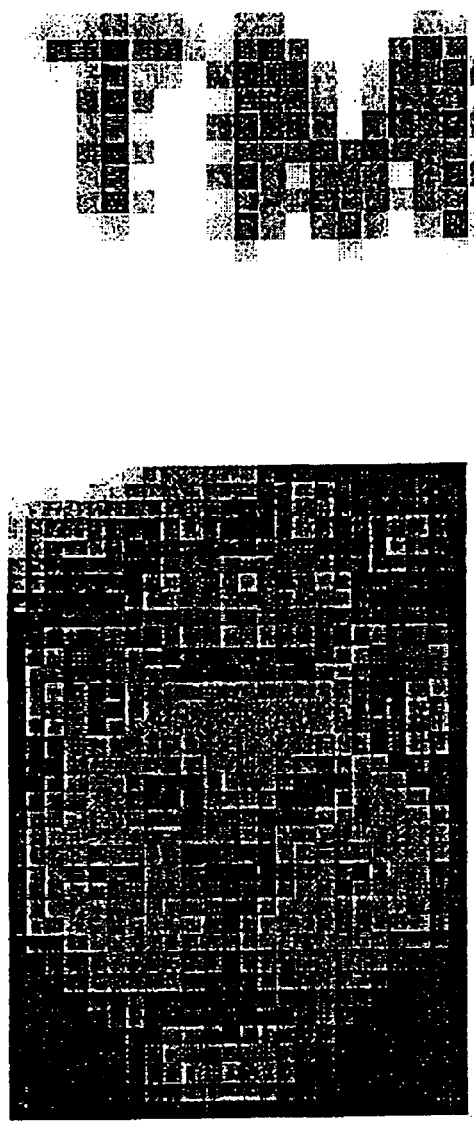
FIG. 5 shows an image recorded using a digital camera with only one CCD array and processed according to convention methods.

To construct a m×n RGB image, the Green and Blue values have to be estimated at photosites covered with Red filter material and the Blue and Red values at photosites covered with Green filter material and finally the Red and Green values at photosites covered with Blue filter material. As can be seen in FIG. 1, the Bayer pattern has twice the number of photosites covered with Green filter material than those with Blue and Red filter material, hence the name Bayer 2G.

The part of the visual wavelengths sampled by the Green photosites represents most of the pure luminance information. The Blue and Red photosites carry most of the chrominance information, but the fact that the Blue and Red photosites also carry a lot of pure luminance information is crucial for the interpolation method of the present invention. In the present invention the missing Green information at photosites covered with Red filter material is solely based on the variation between values from a selected set of Green and Red photosites taken from the surrounding area. The set of values from photosites must be segmented in such a way that it is possible to distinguish between edge boundaries.

Selection of sets of pixels to be considered for possible interpolation depends mostly on the actual layout of the color filter array in question. The number and the choice of set of pixels have profound impact on the performance of the method. In the case of the Bayer 2G pattern, an example of a set of pixels for estimating the Green samples at Red photosites is shown in FIG. 2. The photosite of interest is indicated in bold in FIG. 2.

The same principle can be applied when selecting the set of pixels for estimating the Green samples at Blue photosites. Again, the set of photosites that are chosen for each set of pixels is critical for the correctness of the estimation.

Referring to FIG. 2, the four sets of pixels appear to be sufficient for detection of very fine details without introducing too much noise and other artefacts in low detail areas of the image. A variation value, corr, is calculated for each set of pixels. The variation function indicates the extent to which the information from one color at a given site can be used to estimate the influence of the same color at a different site, i.e., to reduce the influence of the Green color at, e.g., the photosite of a Red filter.

Due to performance constraints, the variation formula must be kept as simple as possible without sacrificing the quality of the output. The formula can be expressed using classic linear correlation.

The formula used in a preferred embodiment of the present invention is given by:

$$\text{mean} := \sum^{m} \frac{G_n}{R_n} \cdot \frac{1}{m}$$

$$\text{corr} := \sum_{n=1}^{m} \left| \frac{G_n}{R_h} - \text{mean} \right|$$

Where G is the green pixels in the set of pixels, R is the red pixels in the set of pixels, m is the number of pixels in each set of pixels, mean is the average ratio between red and green pixels and corr is the variations between red and green pixels. Lower values represent higher correlation.

When a variation value has been calculated for every set of pixels, the set of pixels with the highest correlation (lowest numeric value) is selected. This variation value will be used in the further estimation process. In particular, the variation value (corr) is used to select in which direction in the image the interpolation should be formed. The variation value in a given direction in the image is a measure of a gradient, i.e., variation of color values in that specific direction. Normally, the direction having the smallest gradient will be chose for further processing.

The missing color at a given photosite is expressed in terms of the information contained in the selected set of pixels. If the variation is below a certain threshold, due to noise or other factors, an alternative set of pixels using a different variation method may be selected.

The missing color is estimated as a weighted sum of the green samples divided by the weighted sum of the red samples multiplied by the sampled value from the photosite to be estimated. This may be expressed in the following way:

$$Rw := \sum_{n=1}^{m} R_h \cdot w_n$$

$$Gw := \sum_{n=1}^{m} G_n \cdot w_n$$

$$Ge := R_k \cdot \frac{Gw}{Rw}$$

where Rw is the weighted sum of Red samples in the set of pixels, Gw is the weighted sum of Green samples in the set of pixels, Rk is the sampled value from the photosite in question and Ge is the estimated Green value. It is noted that pixel values of pixels closest to the pixel in which a missing color is to be determined are given higher weights than those pixels which are remote from the pixel. This distance dependence is expressed by the weighting factor in the above equations.

In order to process the full image the above-mentioned process is repeated for each pixel in the image until all the missing color values have been estimated.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. An image processing method comprising:

dividing an image into a matrix of pixels for holding color values;

forming a first set of pixels that are positioned adjacent to a selected pixel;

calculating a first variation value;

forming a second set of pixels that are positioned adjacent to the selected pixel;

calculating a second variation value;

comparing the first and second variation values and selecting the set of pixels having a lowest variation value; and calculating a first color value of the selected pixel by calculating the first color value from first color values of the selected set of pixels, wherein said calculating a first variation value and said calculating a second variation value respectively comprise calculating a ratio between first color values and second color values of abutting pixels of the respective set of pixels, calculating a mean value of the calculated ratios, and calculating a variation value of the respective set of pixels as a sum of an absolute value of a difference between each of the ratios and the mean value.

2. An image processing method comprising:

dividing an image into a matrix of pixels for holding color values;

forming a first set of pixels that are positioned adjacent to a selected pixel;

calculating a first variation value using ratios between color values of the pixels of the first set;

forming a second set of pixels that are positioned adjacent to the selected pixel;

calculating a second variation value using ratios between color values of the pixels of the second set;

comparing the first and second variation values and selecting the set of pixels having a lowest variation value;

calculating a weighted sum of second color values of the selected set of pixels;

calculating a weighted sum of first color values of the selected set of pixels; and calculating the first color value of the selected pixel by multiplying a second color value of the selected pixel with a ratio between the weighted sums of the first color values and the second color values.

3. The method according to claim 1, further comprising forming the sets of pixels to be arranged in rows at an angle of approximately 45 degrees relative to rows and columns of the pixels in the image, and in rows and columns parallel to the rows and columns of the pixels in the image.

4. The method according to claim 1, further comprising forming the sets of pixels to be arranged in rows at an arbitrary angle relative to rows and columns of the pixels in the image.

5. The method according to claim 1, further comprising forming the sets of pixels to take any form.

6. The method according to claim 2, further comprising forming the sets of pixels to be arranged in rows at an angle of approximately 45 degrees relative to rows and columns of the pixels in the image, and in rows and columns parallel to the rows and columns of the pixels in the image.

7. The method according to claim 2, further comprising forming the sets of pixels to be arranged in rows at an arbitrary angle relative to rows and columns of the pixels in the image.

8. The method according to claim 2, further comprising forming the sets of pixels to take any form.

* * * * *